(12) United States Patent
Lavigne

(10) Patent No.: US 12,480,520 B2
(45) Date of Patent: Nov. 25, 2025

(54) FLUID TURBINES

(71) Applicant: EXERGI INCORPORATED, Amherst, NY (US)

(72) Inventor: Dominic Lavigne, Buffalo, NY (US)

(73) Assignee: EXERGI INCORPORATED, Amherst, NY (US)

(*) Notice: Subject to any disclaimer, the term of this patent is extended or adjusted under 35 U.S.C. 154(b) by 0 days.

(21) Appl. No.: 18/674,382

(22) Filed: May 24, 2024

(65) Prior Publication Data

US 2024/0392798 A1 Nov. 28, 2024

Related U.S. Application Data

(60) Provisional application No. 63/504,612, filed on May 26, 2023.

(51) Int. Cl.
| | |
|---|---|
| *F04D 1/06* | (2006.01) |
| *F01D 1/30* | (2006.01) |
| *F01D 5/30* | (2006.01) |
| *F03D 3/06* | (2006.01) |
| *F04D 29/24* | (2006.01) |

(52) U.S. Cl.
CPC ............. *F04D 29/24* (2013.01); *F01D 1/30* (2013.01); *F01D 5/30* (2013.01); *F03D 3/06* (2013.01); *F04D 1/06* (2013.01); *F05D 2220/30* (2013.01); *F05D 2240/24* (2013.01)

(58) Field of Classification Search
CPC ... F04D 29/24; F04D 1/06; F01D 1/30; F01D 5/30; F03D 3/06; F05D 2220/30; F05D 2240/24
See application file for complete search history.

(56) References Cited

U.S. PATENT DOCUMENTS

| | | | |
|---|---|---|---|
| 1,061,206 A | 5/1913 | Tesla | |
| 3,045,428 A | 7/1962 | McLean | |
| 4,347,032 A * | 8/1982 | Possell | F04D 5/001 |
| | | | 415/58.4 |
| 4,402,647 A * | 9/1983 | Effenberger | F01D 1/36 |
| | | | 415/90 |
| 4,641,796 A | 2/1987 | Feifel | |
| 6,328,527 B1 * | 12/2001 | Conrad | F04D 17/161 |
| | | | 416/175 |
| 7,062,900 B1 | 6/2006 | Brun | |
| 7,573,148 B2 | 8/2009 | Nica | |
| 9,279,416 B2 | 3/2016 | Kerns | |
| 9,951,620 B1 * | 4/2018 | Shoffler | F01D 13/02 |
| 2005/0019154 A1 * | 1/2005 | Dial | F01D 1/36 |
| | | | 415/90 |

(Continued)

FOREIGN PATENT DOCUMENTS

DE 102020127270 4/2022

*Primary Examiner* — Andrew J Marien
(74) *Attorney, Agent, or Firm* — Mertzlufft Law PLLC; Joshua Mertzlufft

(57) ABSTRACT

A turbine system includes a housing with a fluid inlet, a fluid outlet, and a rotational mount, and a turbine mounted on the rotational mount. The turbine comprises a first disk with a through-hole, a plurality of first foils arranged radially, and a last disk with a smaller through-hole and. The first foils define a fluid path from the fluid inlet to the fluid outlet. The design allows for efficient fluid flow and rotation of the turbine about the axis, providing an effective and reliable turbine system for various applications.

15 Claims, 16 Drawing Sheets

(56) References Cited

U.S. PATENT DOCUMENTS

| | | |
|---|---|---|
| 2006/0291997 A1 | 12/2006 | Wilson |
| 2008/0131273 A1* | 6/2008 | Fuller .................... F03D 3/062 |
| | | 415/203 |
| 2010/0129193 A1 | 5/2010 | Sherrer |
| 2011/0114057 A1 | 5/2011 | Shkolnik |
| 2011/0150642 A1 | 6/2011 | Detch |
| 2011/0164958 A1 | 7/2011 | Saitoh |
| 2012/0014779 A1* | 1/2012 | Gilliam .................. F04D 5/001 |
| | | 416/4 |
| 2013/0327010 A1 | 12/2013 | Muller |
| 2017/0051757 A1* | 2/2017 | Sarmiento ............... F04D 29/42 |
| 2019/0055843 A1* | 2/2019 | Berkson ................. F01D 5/048 |

* cited by examiner

FLUID TURBINES

CROSS REFERENCE TO RELATED APPLICATIONS

This application claims priority to U.S. Provisional Application No. 63/504,612, filed on May 26, 2023, the entire disclosure of which is hereby incorporated by reference.

BACKGROUND

Turbine systems are used in various applications to effect a conversion between fluid flow energy and mechanical energy. Conventional turbine systems may consist of a housing with a fluid inlet and outlet, and a turbine mounted within the housing to rotate about an axis. The turbine includes a series of blades or foils that interact with the fluid flow to generate rotational motion. These blades are secured to one or more disks that are coaxial with the rotational axis of the turbine. In conventional turbine designs, the blades or foils are arranged in a radial pattern around the rotational axis of the turbine.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

In some aspects, the techniques described herein relate to a turbine system, including: a housing including a fluid inlet, a fluid outlet, and a rotational mount; and a turbine disposed on the rotational mount and configured to rotate about an axis of the rotational mount, the turbine including: a first disk coaxial with a rotational axis defined by a first disk radius, a first disk thickness, a first through-hole coaxial with the rotational axis and having a first through-hole radius, and a plurality of first disk securing through-holes; a plurality of first foils arranged in a first radial pattern about the rotational axis, each first foil having a leading edge, a trailing edge, an upper surface, and a lower surface and defined by a first foil thickness equal to the first disk thickness and a first foil securing through-hole, wherein a first foil incircle radius of a first foil incircle defined by the plurality of first foils is equal to the first through-hole radius; a last disk coaxial with the rotational axis defined by a last disk radius equal to the first disk radius, a last disk thickness equal to the first disk thickness, a last through-hole coaxial with the rotational axis and having a last through-hole radius smaller than the first through-hole radius, and a plurality of last disk securing through-holes; and a plurality of fasteners, each fastener disposed within one of the first disk securing through-holes, one of the first foil securing through-holes, and one of the last disk securing through-holes; wherein a fluid path from the fluid inlet to the fluid outlet is defined by the first disk, the last disk, and the first foils.

In some aspects, the techniques described herein relate to a turbine system, wherein each first foil defines a chord line external to the extents of the first foil.

In some aspects, the techniques described herein relate to a turbine system, wherein the rotational mount includes an eccentric bearing, and wherein the turbine is configured to rotate about an axis-of-rotation of the eccentric bearing.

In some aspects, the techniques described herein relate to a turbine system, including: a first disk coaxial with a rotational axis defined by a first disk radius, a first disk thickness and a first through-hole coaxial with the rotational axis and having a first through-hole radius; a plurality of first foils arranged in a first radial pattern about the rotational axis, each first foil having a leading edge, a trailing edge, an upper surface, and a lower surface and defined by a first foil thickness equal to the first disk thickness; and a last disk coaxial with the rotational axis defined by a last disk radius equal to the first disk radius, a last disk thickness equal to the first disk thickness and a last through-hole coaxial with the rotational axis and having a last through-hole radius smaller than the first through-hole radius; wherein each first foil defines a chord line external to the extents of the first foil.

In some aspects, the techniques described herein relate to a turbine system, further including a plurality of fasteners and wherein the first disk is further defined by a plurality of first disk securing through-holes, each first foil is further defined by a first foil securing through-hole, the last disk is further defined by a plurality of last disk securing through-holes, and each fastener is disposed within one of the first disk securing through-holes, one of the first foil securing through-holes, and one of the last disk securing through-holes.

In some aspects, the techniques described herein relate to a turbine system, further including a housing including a fluid inlet, a fluid outlet, and a rotational mount, wherein the first disk is mounted on the rotational mount and a fluid path from the fluid inlet to the fluid outlet is defined by the first disk, the last disk, and the first foils.

In some aspects, the techniques described herein relate to a turbine system, including: a first disk coaxial with a rotational axis defined by a first disk radius, a first disk thickness, and a first through-hole coaxial with the rotational axis and having a first through-hole radius; a plurality of first foils arranged in a first radial pattern about the rotational axis, each first foil having a leading edge, a trailing edge, an upper surface, and a lower surface and defined by a first foil thickness; and a last disk coaxial with the rotational axis defined by a last disk radius, a last disk thickness, and a last through-hole coaxial with the rotational axis and having a last through-hole radius.

In some aspects, the techniques described herein relate to a turbine system, wherein the last disk radius equals the first disk radius.

In some aspects, the techniques described herein relate to a turbine system, wherein the first foil thickness equals the first disk thickness.

In some aspects, the techniques described herein relate to a turbine system, wherein the last disk thickness equals the first disk thickness.

In some aspects, the techniques described herein relate to a turbine system, wherein the last disk thickness equals the first disk thickness.

In some aspects, the techniques described herein relate to a turbine system, wherein the last through-hole radius equals the first through-hole radius.

In some aspects, the techniques described herein relate to a turbine system, wherein the last through-hole radius is smaller than the first through-hole radius.

In some aspects, the techniques described herein relate to a turbine system, wherein a first foil incircle radius of a first foil incircle defined by the plurality of first foils is equal to the last through-hole radius.

In some aspects, the techniques described herein relate to a turbine system, further including: a plurality of second foils arranged in a last radial pattern about the rotational axis and defined by a second foil thickness; and an intermediate disk coaxial with the rotational axis defined by an intermediate disk radius, an intermediate disk thickness, and an intermediate through-hole coaxial with the rotational axis and having am intermediate through-hole radius.

In some aspects, the techniques described herein relate to a turbine system, wherein the second foil thickness equals the first foil thickness.

In some aspects, the techniques described herein relate to a turbine system, wherein the intermediate through-hole radius equals the first through-hole radius and the last through-hole radius.

In some aspects, the techniques described herein relate to a turbine system, wherein the intermediate through-hole radius is smaller than the first through-hole radius and larger than the last through-hole radius.

In some aspects, the techniques described herein relate to a turbine system, wherein a first foil incircle radius of a first foil incircle defined by the plurality of first foils is equal to the last through-hole radius and a second foil incircle radius of a second foil incircle defined by the plurality of second foils is equal to the last through-hole radius.

In some aspects, the techniques described herein relate to a turbine system, wherein the first disk is further defined by a plurality of first disk securing through-holes, each first foil is further defined by a first foil securing through-hole, and the last disk is further defined by a plurality of last disk securing through-holes and the turbine system further includes a plurality of fasteners, wherein each fastener is disposed within one of the first disk securing through-holes, one of the first foil securing through-holes, and one of the last disk securing through-holes.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1A:
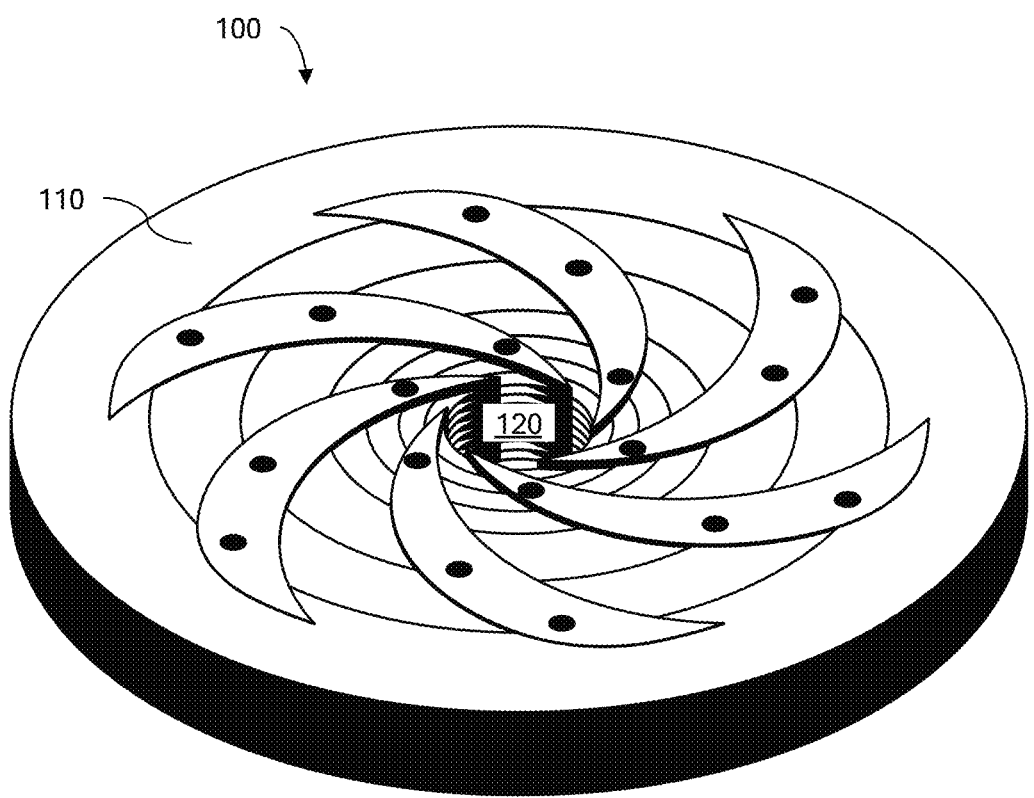
FIG. 1A illustrates a turbine, according to one or more implementations herein.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

A turbomachine rotates at high angular speeds converting energy between fluid motion and rotational mechanical motion. A foil (e.g., an airfoil or fluid foil) is a streamlined shape, usually with a curved upper surface and a flatter or more curved lower surface configured to generate lift when a fluid moves around it. Turbines operate by utilizing many foil-shaped blades around a central axis. However, conventional turbines have several shortcomings, including mechanical complexity and difficulty developing motion or meaningful torque when operating at low flows or with light or low volume fluids.

Conventional steam turbines typically require a large assembly of hundreds or thousands of small blades oriented such that high pressure causes rotation. As such, conventional steam turbines are very costly, difficult to design, and highly inefficient on small scales. In contrast, implementations herein are mechanically simple and highly efficient at both small and large scales.

Conventional wind turbines require a large sweeping diameter which is limited in efficiency by Betz' law (i.e., as air flows through a certain area, and as wind speed slows from losing energy to extraction from a turbine, the airflow must distribute to a wider area). In contrast, implementations herein could operate as a wind turbine not restricted by Betz's law as they do not have a sweeping diameter.

Conventional compressors and fans are often oriented as a series of blades centralized on an axle, pulling air from behind themselves and pushing it forward. In contrast, implementations herein pull from the sides, and can be scaled in power simply by extending the length of the disk assembly (e.g., adding more disks).

A conventional turbine that attempts to solve these shortcomings is a bladeless turbine. A bladeless turbine creates rotational motion by harnessing viscous drag across the surfaces of thin discs which are closely spaced together. The conventional configuration of the bladeless turbine is a stack of thin disks with holes around the axial center, with thin spacers (typically spokes or standard washers) between each disk, all encased in a closed configuration with at least one inlet and at least one outlet. The bladeless turbine provides for simplicity of construction and a high theoretical efficiency at small scales. However, while the conventional bladeless turbine can generate high angular velocities, the developed torque is too low to be of practical use. This combination of high speed and low torque can lead to mechanical failure of the disks at the outer edge, and a low isentropic efficiency. Further deficiencies of bladeless turbines precluding practical applications include large diameter assemblies facing extreme dynamic forces at the disk tips, a disk's tendency to warp uncontrollably while spinning, revolutions-per-minute (RPM) being too high at the expense of torque required for many applications, and likelihood of the assembly to reach resonance, among others.

Implementations herein improve upon the conventional attempts by providing a high-speed, high-torque turbine that can operate with light fluids or low flows without the problems of mechanical wear associated with conventional turbines and bladeless turbines. To effect this, implementations of turbine systems herein include turbines which may include thin disks stacked in close spacing along an axial center, in parallel, spaced by thin foils arranged in a radial pattern about the axial center, and designed to be accompanied by a tangential inlet and an axial outlet. In some implementations, the stack of disks and foils may be held together by fasteners (e.g., lock bolts), but in others, the disks and foils may be adhered, mechanically fit, integral, or monolithic. As a high temperature, high pressure fluid passes from a tangential inlet, through the turbine, to the axial outlet, lift may be generated on the foils and viscous drag may be generated on the disks to efficiently convert kinetic energy from the fluid to high-torque, high-speed rotational motion of the turbine.

The viscous drag energy transfer takes advantage of the principle of the boundary layer condition. The boundary layer condition is mathematical method of approximating interfaces between physical mediums. In fluid mechanics, the boundary layer is applied at the interface between solid materials and moving fluids as a means of estimating friction. The bladeless turbine utilizes this principle to create rotational motion. As a working fluid flows along the surface of the disks tangentially from the inlet, rotational work is done on the body along the central axis which causes an increase in rotational speed. As the fluid flows towards the exit, the flow becomes increasingly more radial.

In implementations of turbines herein, the fluid may enter from the outer radius of the disks tangential, approximately tangential, or at a desired offset from tangential, to the disk, the large central through-hole may remain entirely open such to allow vortex propagation at the fluid outlet.

As the fluid flows from the disk tip to the foil outlet, the direction of flow should not be greatly interrupted, and the velocity of the fluid should be drastically increased. The shape and angle of the foil spacers may develop a force in the direction of rotation as the fluid enters the leading edge and maintain rotational direction with the rotor as the fluid exits the trailing edge. This feature is intended to create positive drag as the fluid exits the system. The foil spacers may be disposed such that the trailing edges are in contact with the inner radius of the disks (e.g., forming an incircle coaxial with and of equal radius to the radius of the smallest through-hole of the disks). The foils may further control and stabilize the fluid as it passes along the surface of the disks, increase the mass of the system for more controlled rotational speeds and higher torque, and overall boosts the efficiency and practicality of the device with no significant increase in cost of production.

The foils and the disks may vary in shape and size depending on design or application requirements. For example, a gradient across the shape and size of the foils and disks may be implemented to provide a stepped turbine design. Multiple groups of gradient-based stepped foil-disk layers may be used together in a grouped turbine pack.

Implementations herein are efficient, cost effective, and elegant in design, and they have potential applications in numerous different pieces of equipment as high efficiency alternatives to conventional energy conversion devices. These include turbines, combustion engines, pumps, and many more.

The rotational energy developed within the turbine may be harnessed in a variety of mechanical applications, including for the performance of direct or indirect mechanical work (e.g., in a fluid-powered tool or machine) or the generation of electricity. In implementations where electricity is generated, a generator may be in mechanical communication (e.g., directly, or indirectly through a gearing system, directional energy changing system, mechanical transmission, fluid transmission, clutch, etc.) with at least one output shaft of the turbine, and the rotational motion of the turbine may thus turn the generator.

Implementations herein may utilize a variety of working fluids, including both liquids (e.g., water, oil, glycol, etc.) and gases (e.g., air, compressed air, steam, wet steam, dry steam, etc.).

A further example implementation may include an improved efficiency, lower cost, small scale steam turbine. For example, a stackable vaneless turbine may be used on a relatively small scale (~ 1 KW), to convert solar radiation into mechanical work, and then to electrical energy. Similar principles apply to larger-output applications.

A further example implementation may include an internal combustion engine including a single rotor with n number of foils cut directly along the outer edge of a single disk. Combustion chambers would be strategically placed around the casing to provide continuous power. This example implementation would be a no-piston combustion engine.

Some implementations may include multiples of 3× foils placed concentrically around the disk with even spacing such that the rotor is perfectly balanced. Other implementations may include a single foil, or a multiple of 2×, 5×, or any multiple of a prime number of foils.

An example implementation may include a spinning top including two (or more) disks with foils spaced therebetween, a nozzle is extruded from the bottom of one disk, where contact with a physical surface is made, the top disk features a flat surface with a small hole, the foils are. The device may be spun, this is an input of mechanical rotational force/energy; as the device spins air is pulled from the surrounding environment and forced into the center of the assembly, forming a vortex. This vortex forces air downward, creating a thrust force at the base of the assembly, thus reducing the contact friction between the spinning top and the surface it is spinning on. This translation of energy allows the device to spin for a prolonged period. This configuration could be used in cooling processes, fans, pumps, compressors, or even propulsion devices for land, sea, air, or space motor vehicles.

The materials of construction of one or more of the components may include metal, composite, polymers, or ceramic blades depending on the use case. Blades may experience large dynamic forces in some conditions, and as such high-strength materials may be used.

FIG. 1A illustrates a turbine 100, according to one or more implementations herein. The turbine 100 may provide for a conversion between kinetic energy in a fluid and rotational energy in the turbine 100. The turbine 100 may compose a turbine system, and may include a variety of components and configurations and may be configured for output to or input from a variety of mechanical systems, and it will be understood that the examples of the turbine 100 provided here are for illustrative purposes only.

The turbine 100 may comprise one or more disk groups 110. A disk group 110 may include components such as a disk and a foil. The disk group 110 may include a plurality of disks and foils. The disk group 110 may include multiple disks and foils, which may be arranged as laminations to form the disk group 110. In such implementations where there are multiple disks of the disk group 110, an inner diameter of the disks may in some implementations vary to form a stepped inner volume. The disk group may be held together, for example, using fasteners disposed through securing through-holes in the disks and/or foils. In other implementations, the disk group may be secured using an adhesive, be friction fit, be mechanically fit (e.g., by interference fit of extensions from one disk/foil into corresponding depressions in another disk/foil), be cast, or be monolithic.

The disk group 110 may be configured for the development of fluid flow, where a fluid may impinge upon a leading edge of each foil and transit the foil, generating lift, toward a through-hole 120 located axially in the turbine 100. The fluid may further develop viscous drag via its boundary layer with the disks, which may further transfer energy from the fluid to the turbine in addition to the energy transferred by the generation of lift on the foils. A stepped configuration in some implementations may additionally provide for consistent fluid volume flow, or volume expansion (including expansion of the boundary layer), as the fluid approaches the through-hole 120.

Figure 1B:
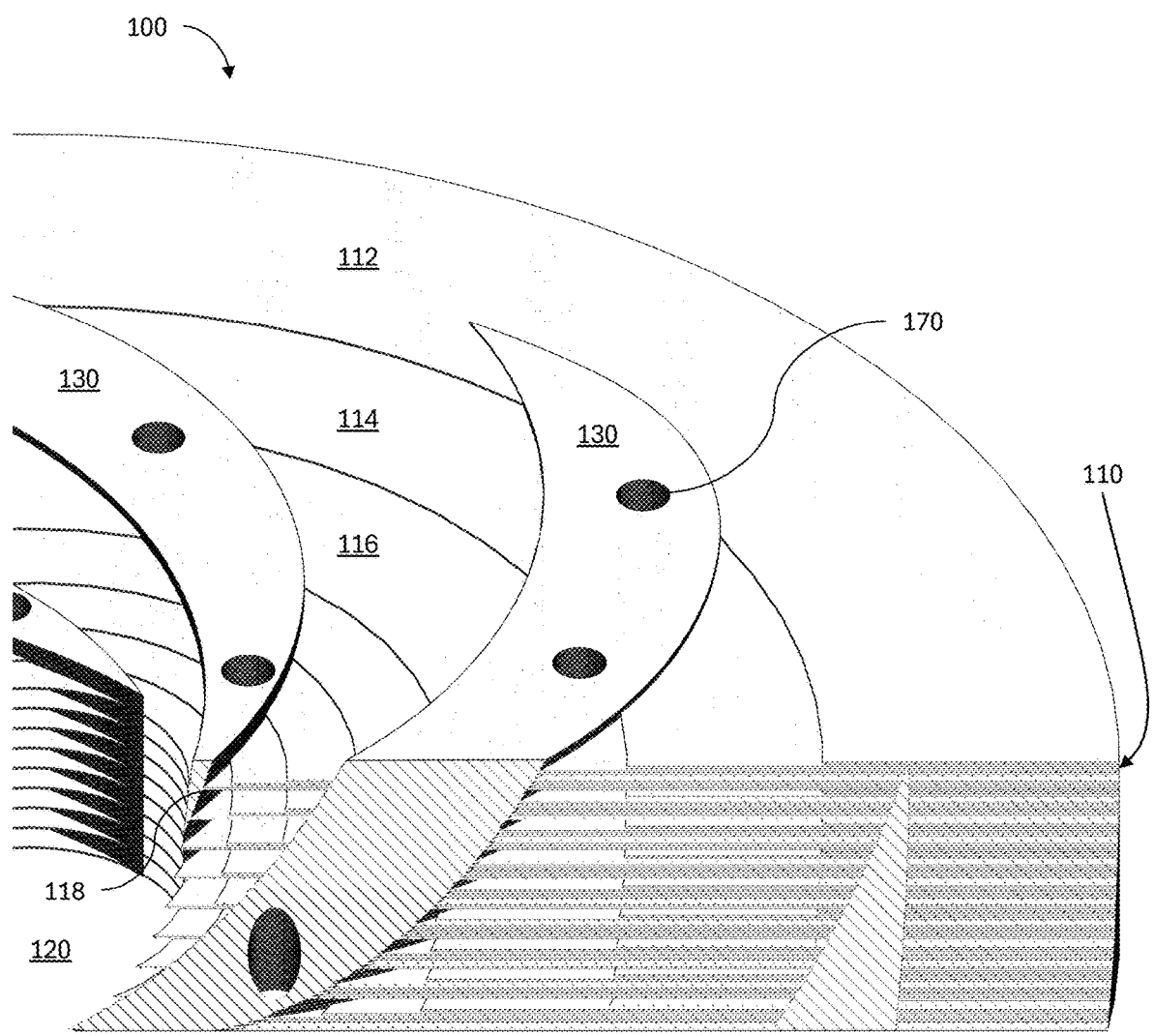
FIG. 1B illustrates a mitered quarter section of the turbine, according to one or more implementations herein.

FIG. 1B illustrates a mitered quarter section of the turbine 100, according to one or more implementations herein. FIG. 1B illustrates the layering of disk groups, including the disk group 110 as well as the cross-sectional geometry formed by the laminations of the disks and the foils over the axis of the turbine 100. In some implementations, the incircles of the foils, the incircles of the foil extensions, and the through-hole of the last disk may all be coaxial and of equal radius.

The disk group 110 may be one of several disk groups forming the turbine 100. The disk group 110 may include several disks, such as for example, a first disk 112, an intermediate (second) disk 114, another intermediate disk 116, further intermediate disks, and a last disk 118. It will be understood that the disks may share a common through-hole radius or may vary in through-hole radius so as to form a stepped disk group. The through-hole 120 may provide a central manifold for the collection and vortex of fluid after it has acted upon the foils of the disk group 110. The disk group 110 may include a plurality of foils 130. The foils 130 may be arranged in a radial pattern such that, for example, their leading edges are set at a further radius from the central axis of the turbine than their trailing edges. In the example illustrated in FIG. 1B, the foils 130, the first disk 112, the intermediate disk 114, the intermediate disk 116, further intermediate disks, and the last disk 118 are further defined by a plurality of disk securing through-holes 170, which may collectively receive a plurality of fasteners (e.g., a fastener may be disposed in each disk securing through-hole 170) to mechanically connect the foils 130, the first disk 112, the intermediate disk 114, the intermediate disk 116, further intermediate disks, and the last disk 118.

Figure 2A:
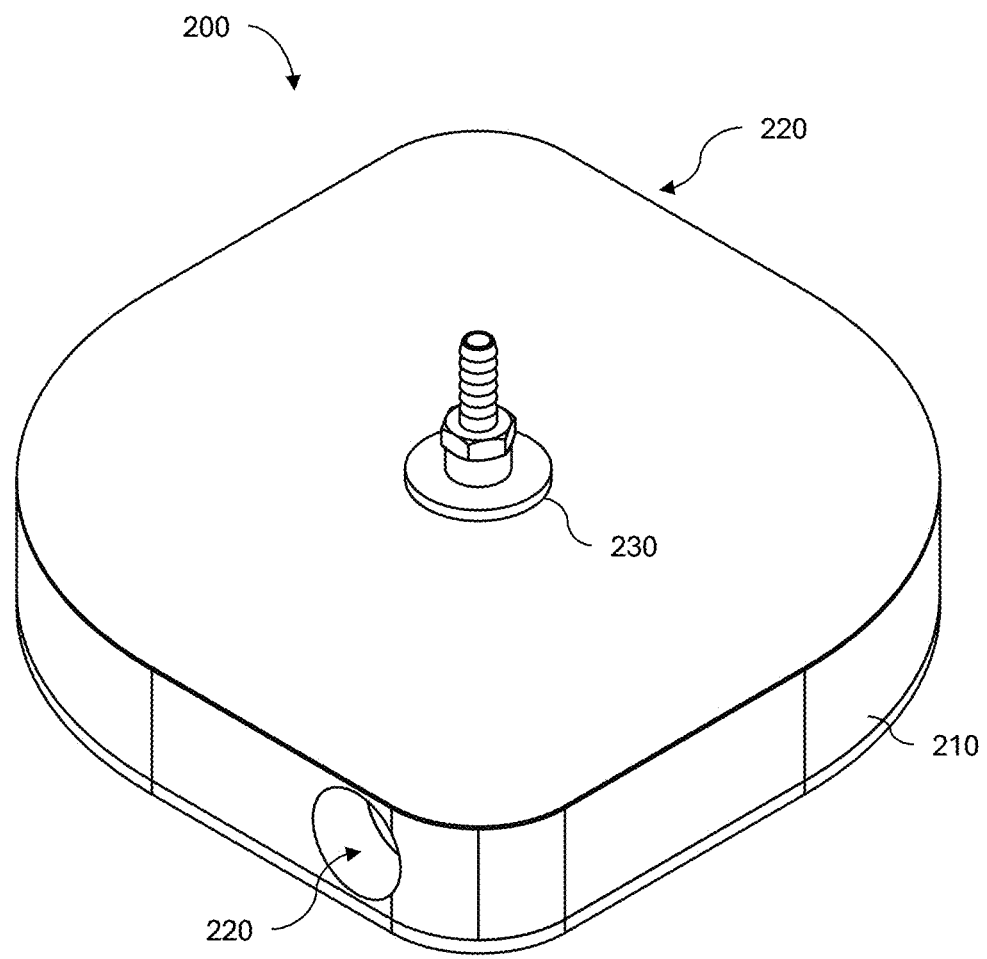
FIG. 2A illustrates a turbine system, according to one or more implementations herein.

FIG. 2A illustrates a turbine system 200, according to one or more implementations herein. The turbine system 200 may include a turbine similar to, for example, the turbine 100. The turbine system 200 may form a fluid flow path to, across, and from the turbine and may be used for locating the turbine. The turbine system 200 may include a housing 210, one or more inlets 220, an outlet 230, as well as other components as will be described in the following paragraphs. The one or more inlets 220 may be set tangential to the turbine, and the outlet 230 may be set axial to the turbine.

Figure 2B:
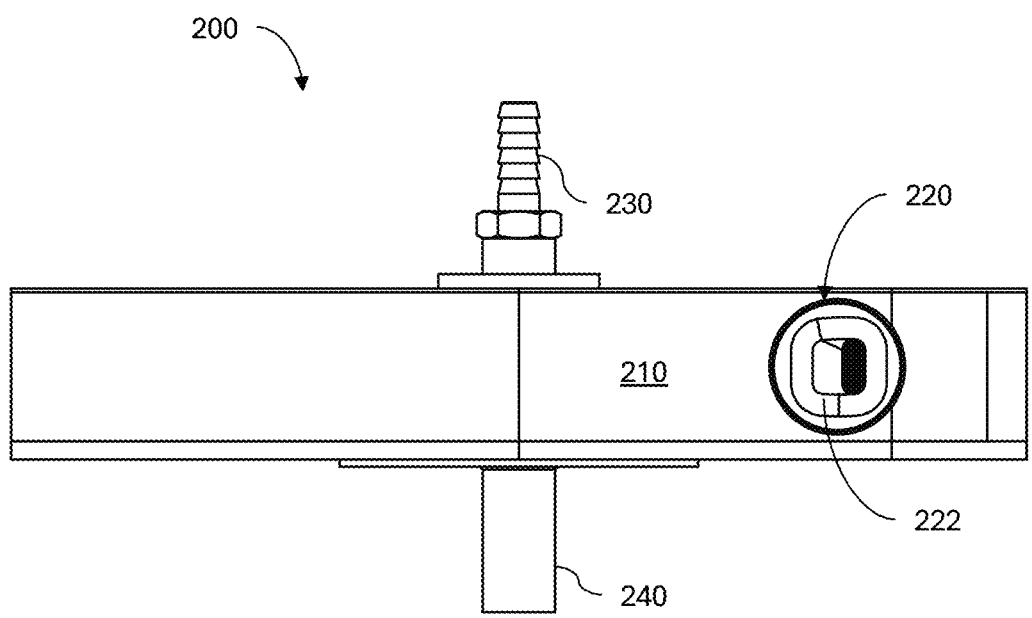
FIG. 2B illustrates a side view of the turbine system, according to one or more implementations herein.

FIG. 2B illustrates a side view of the turbine system 200, according to one or more implementations herein. The turbine system 200 may be configured to promote fluid flow from the inlets 220 to the turbine by including a nozzle 222. The nozzle 222 may promote laminar flow of fluid directly to the turbine.

In some implementations, the nozzle 222 may be shaped to promote laminar flow tangential to the disks of the turbine over an entire height of the turbine stack. In other implementations, the nozzle 222 may be configured as a diffuser to promote an expansion of the fluid flow cross section over the entire height of the turbine stack. The turbine system 200 may further include a shaft 240, which may function as a mechanical rotational energy output from the turbine.

The turbine system 200 may further include an outlet 230, which may be disposed along the central axis of the turbine system 200 and may provide for expulsion of fluid after the fluid has passed through the through-hole of the turbine.

In some implementations, the turbine system 200 may be operated as a pump. In implementations where the turbine system is operated as a pump, the shaft 240 may function to input rotational energy or the turbine may otherwise be mechanically operated upon to induce rotational motion. It will be understood that in some implementations of the turbine system 200 where the turbine system 200 is used as a pump that the direction of fluid flow may be reversed, that is the outlet 230 may operate as an inlet and the inlet 220 may operate as an outlet. In implementations where the turbine system 200 functions as a pump the nozzle 222 may be an optional component.

Figure 2C:
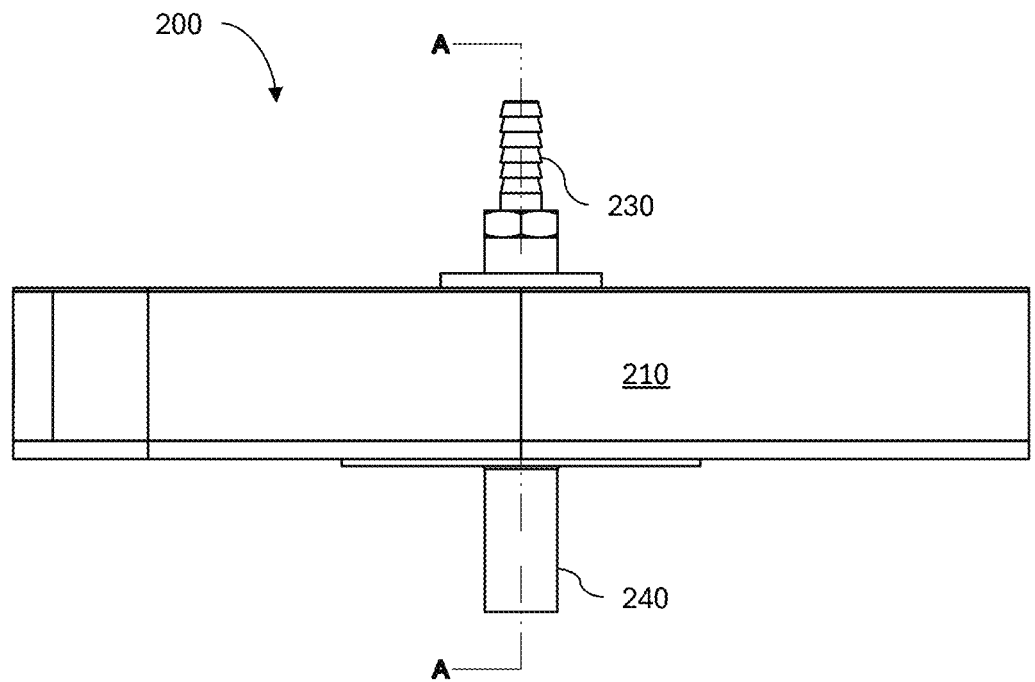
FIG. 2C illustrates a further side view of the turbine system, according to one or more implementations herein.

FIG. 2C illustrates a further side view of the turbine system 200, according to one or more implementations herein. Section A-A is illustrated in FIG. 2D.

Figure 2D:
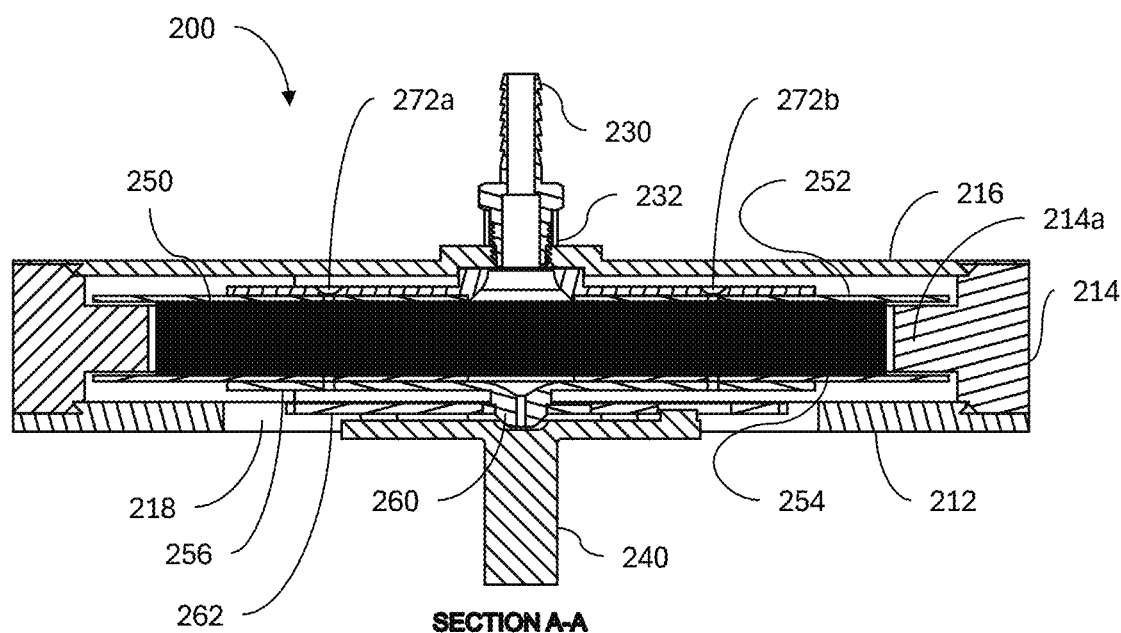
FIG. 2D illustrates section view A-A of the turbine system, according to one or more implementations herein.

FIG. 2D illustrates section view A-A of the turbine system 200, according to one or more implementations herein. The section view A-A may illustrate the internal components of the turbine system 200, which may provide for support of a turbine 250 such that the turbine 250 can rotate with the shaft 240.

The turbine 250 may be disposed between a first platter 252 and a second platter 254. The first platter 252 and the second platter 254 may provide for alignment and physical support of the turbine 250. The first platter 252 and the second platter 254 may be attached to the turbine 250 by a fastener connection, a friction connection, mechanical fit, or other type of connection. In the implementation illustrated in FIG. 2D, a plurality of fasteners, of which fastener 272a and fastener 272b are visible in FIG. 2D, mechanically connect the first platter 252, the second platter 254, and the turbine 250. In some implementations the first platter 252 and the second platter 254 may be integral to the turbine 250. In further implementations, the turbine 250, the first platter 252, and the second platter 254 may be monolithic. The first platter 252 may include a central through-hole to permit fluid expelled from the through-hole of the turbine 250 to flow to the outlet 230. The outlet 230 may include a nozzle 232, which may include a threaded connection to a rotational, barbed, and/or quick-connect connection in some implementations.

The turbine assembly of the turbine 250, the first platter 252, and the second platter 254 may be mounted to the housing via an eccentric bearing 262. The eccentric bearing 262 may be supported in part by the housing, which may permit communication of rotational motion from the turbine 250 to the shaft 240. The eccentric bearing 262 may permit the cycloid 256 to spin in an opposite direction to the input as a result of contact between the cycloid 256 and outer pins of the eccentric bearing 262.

The turbine assembly may be movable relative to the shaft 240 in some implementations and be mechanically connected via a cycloid 256. The cycloid 256 may provide for transmission of rotational energy between the turbine assembly and the shaft 240. The cycloid 256 may provide for a gearing reduction based on a number of ridges of the cycloid and a number of corresponding pins (e.g., FIG. 2D illustrates a 28:1 gear reduction). The cycloid 256 may provide for low mechanical wear, high-speed operation, configurable gearing reduction, and compact design. An alignment bearing 260 may provide for maintaining central alignment and support to the turbine assembly.

The housing of the turbine system 200 may include various components to facilitate assembly and maintenance. For example, the housing 210 may include a first lid 212, a wall 214, and a second lid 216. In some implementations, the wall 214 may itself comprise two or more segments. The first lid 212 may include an opening 218 sized to facilitate pass-through of the shaft 240, the eccentric bearing 262, and the alignment bearing 260. The opening 218 may be further sized to permit passage of fluid into and out of a cavity defined by the first platter, the wall 214, and the first lid 212 (e.g., the passage and cycling of external air or another fluid to cool the components of the turbine). In some implementations, the opening 218 may be oriented to provide for gravity drainage of condensate (e.g., surface condensate or gland seal condensate). The opening 218 may thus provide for operation in phase-changing (e.g. Rankine) cycles. In implementations of the turbine system 200 that operate on a non-phase-changing cycle (e.g., Brayton), the opening 218 may be obviated.

The wall 214 may include one or more protrusions 214a configured to align the turbine assembly by fitting between the first platter 252 and the second platter 254. The second lid 216 may include an opening sized to permit flow of fluid from the through-hole of the turbine to the nozzle 232. The nozzle 232 may be disposed on (e.g., attached to or monolithic to) the second lid 216.

Figure 2E:
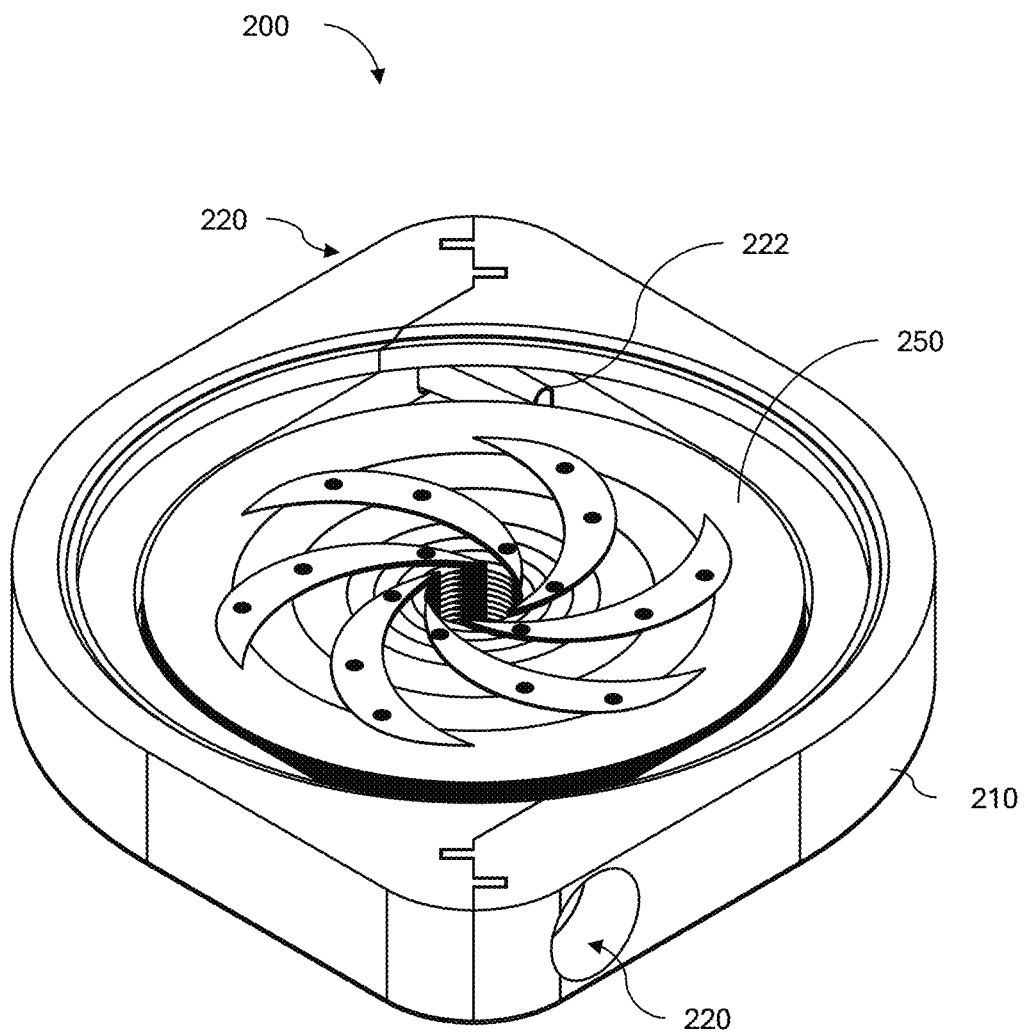
FIG. 2E illustrates a bottom perspective view of the turbine system with the shaft, the eccentric bearing, the alignment bearing, the cycloid, and the first lid removed, according to one or more implementations herein.

FIG. 2E illustrates a bottom perspective view of the turbine system 200 with the shaft 240, the eccentric bearing 262, the alignment bearing 260, the cycloid 256, and the first lid 212 removed, according to one or more implementations herein. Inside of the turbine system 200 may be the nozzle 222 and the turbine 250. The turbine 250 may, for example, be similar to the turbine 100.

Figure 3A:
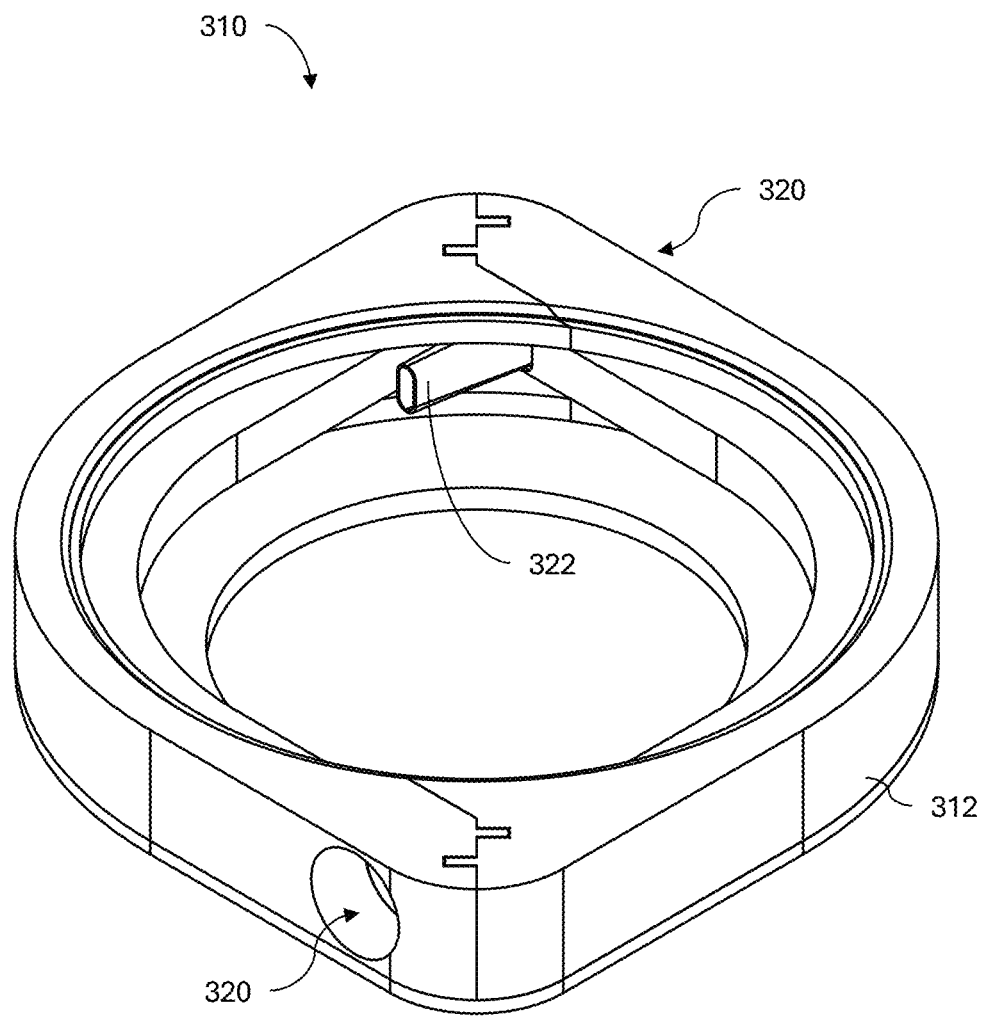
FIG. 3A illustrates a housing of a turbine system, according to one or more implementations herein.

FIG. 3A illustrates a housing 310 of a turbine system, according to one or more implementations herein. The housing 310 may be similar to, for example, the housing 210. The housing 310 may include one or more inlets 320, which may be similar to, for example, the inlets 220, a housing body 312 which may provide structural support and fluid containment for the housing 310, and one or more nozzles 322, which may be similar to, for example, the nozzles 222.

Figure 3B:
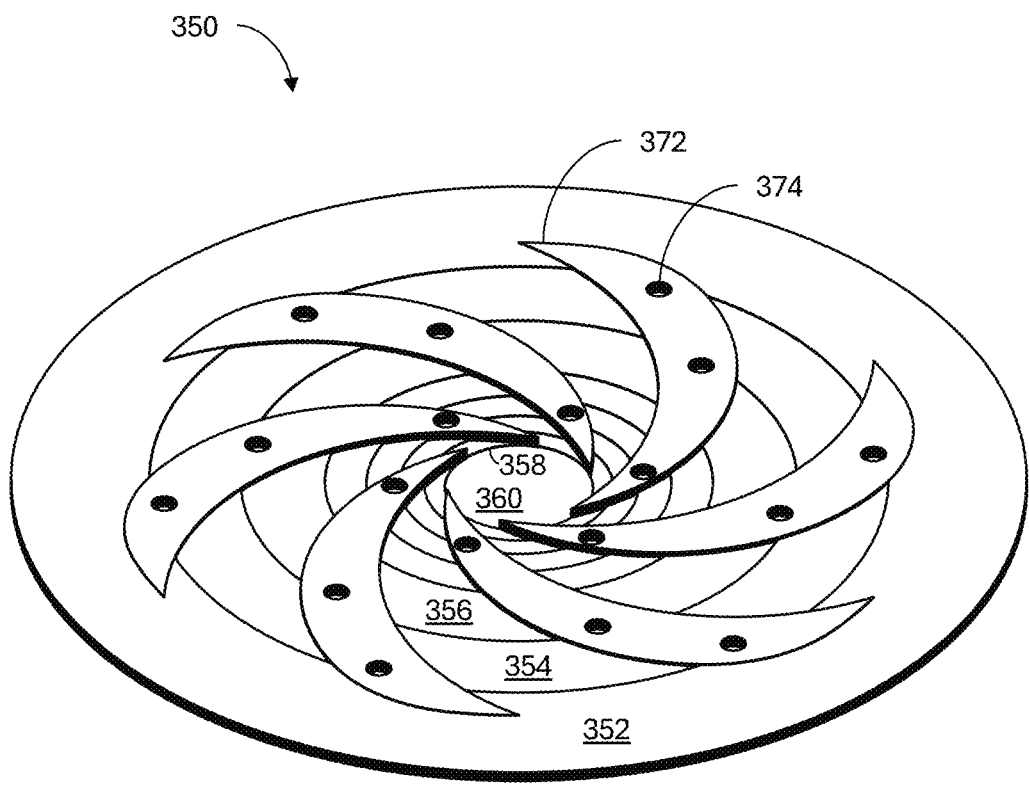
FIG. 3B illustrates a disk group of a turbine, according to one or more implementations herein.

FIG. 3B illustrates a disk group of a turbine 350, according to one or more implementations herein. The disk group may include a plurality of disks, including, for example, a first disk 352, an intermediate (second) disk 354, another intermediate disk 356, other intermediate disks, and a last disk 358. The disk group may further include a plurality of laminated foils 372. The foils may include foil securing through-holes 374. A through-hole 360 may be defined by the disks 352-358 and the foils 372 along the rotational axis of the disk group. In some implementations, instead of foil securing through-holes 374, protrusions (e.g., dimples) may be present in the disks and foils, which may be used to align the disks and foils and then be pressed together to form interference fits therebetween.

Figure 3C:
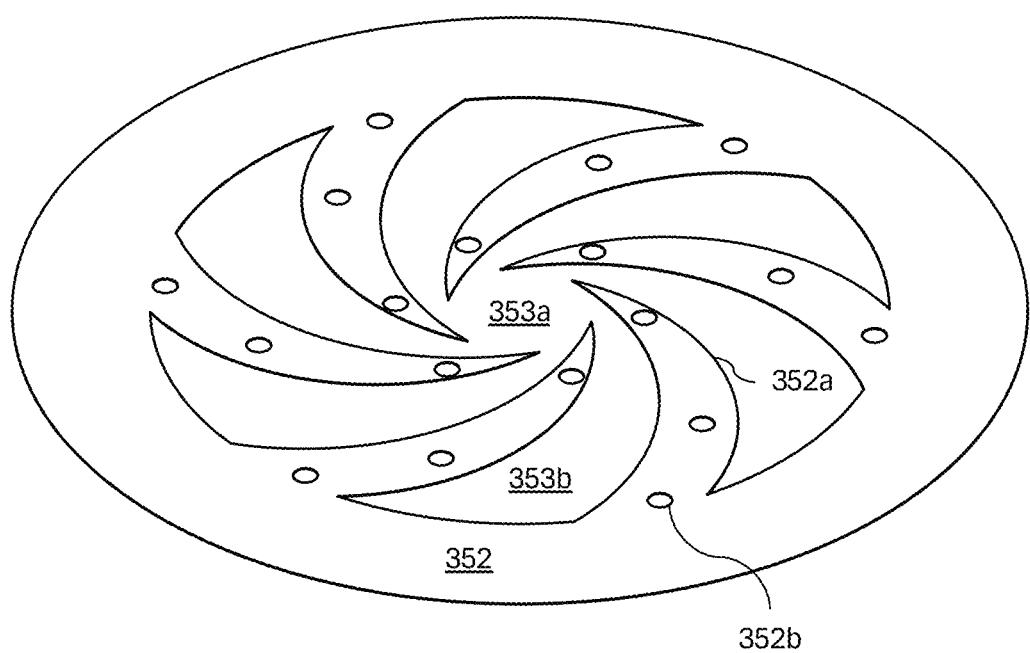
FIG. 3C illustrates a first disk, according to one or more implementations herein.

FIG. 3C illustrates a first disk 352, according to one or more implementations herein. The first disk 352 may include a plurality of foil extensions 352a, which may themselves include one or more disk securing through-holes 352b or other means of fastening the disks and foils together.

A first disk through-hole inner portion 353a may be defined by the incircle of the foil extensions 352a. A first disk through-hole outer portion 353b may be defined as the negative space bounded by the foil extensions 352a, the first disk 352 and the upper and lower planes thereof, and the first disk through-hole inner portion 353a. Accordingly, the first disk through-hole inner portion 353a and the first disk through-hole outer portion 353b may together define a negative space through which fluid may flow. The extents of this negative space (i.e., the circle circumscribing the first disk through-hole outer portion 353b) may define the first through-hole radius of the first disk 352.

Figure 3D:
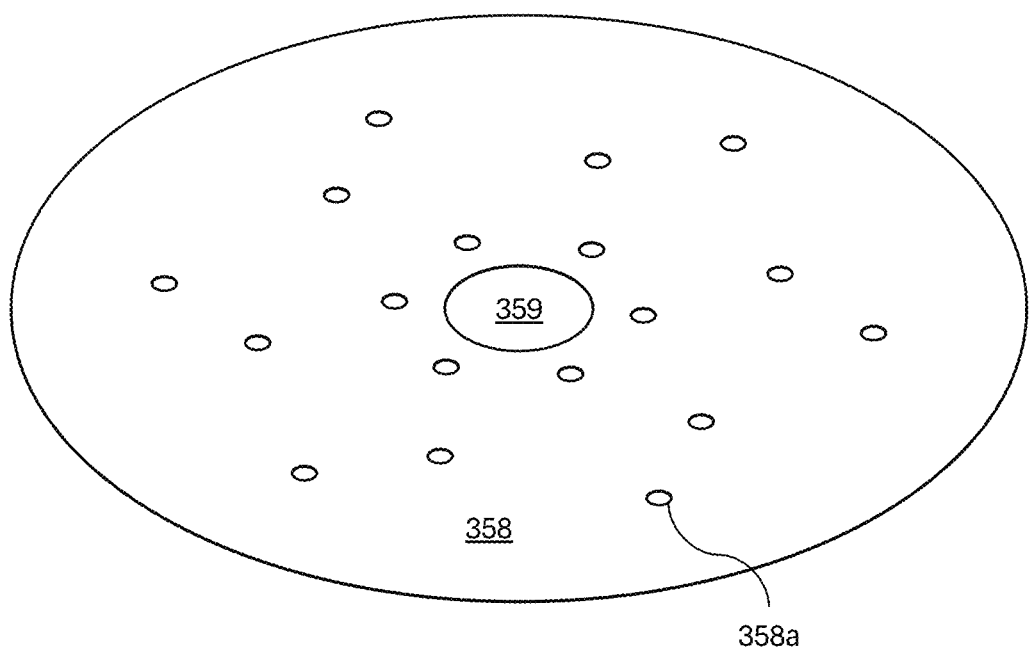
FIG. 3D illustrates a last disk, according to one or more implementations herein.

FIG. 3D illustrates a last disk 358, according to one or more implementations herein. Unlike the first disk 352, the last disk 358 need not have foil extensions. The last disk 358 may include a through-hole 359, which may correspond in radius to the first disk through-hole inner portion 353a.

One or more intermediate disks and foils may be disposed between the first disk 352 and the last disk 358 (e.g., the intermediate disk 354 and/or the intermediate disk 356) to form a stepped turbine. It will be understood that a stepped turbine disk group may have two or more disks and two or more radial turbine arrays. Where a stepped turbine has intermediate disks, the intermediate disks may vary in negative space defined by their respective through-hole inner portions and through-hole outer portions. The stepped turbine disk group may include radial foil arrays having an equal incircle or a stepped incircle. In implementations where the turbine is not stepped, all disks may be configured like the last disk 358. The last disk 358 may include a plurality of last disk securing through-holes 358a.

Figure 3E:
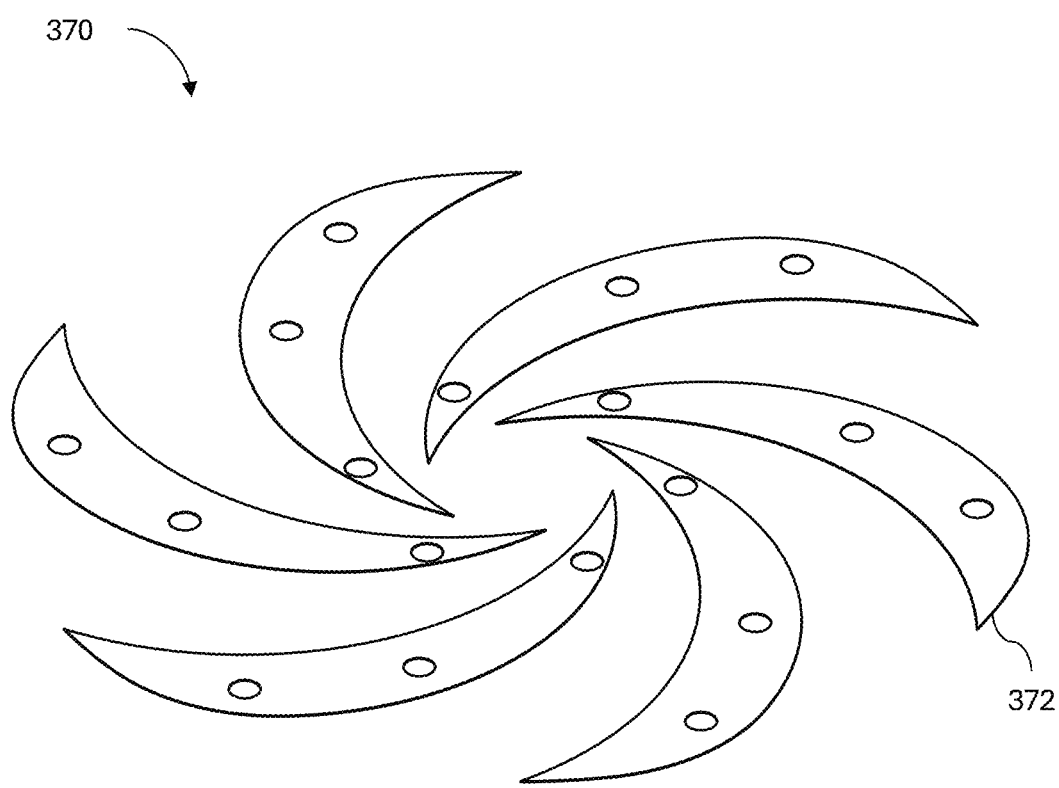
FIG. 3E illustrates a radial foil array, according to one or more implementations herein.

FIG. 3E illustrates a radial foil array 370, according to one or more implementations herein. The radial foil array 370 may include one or more foils 372.

Figure 3F:
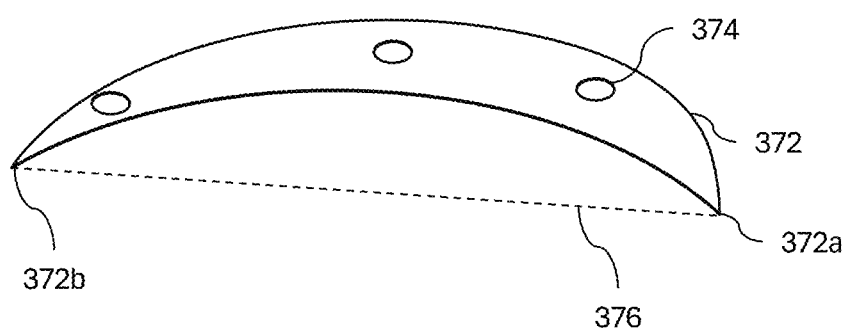
FIG. 3F illustrates a foil, according to one or more implementations herein.

FIG. 3F illustrates a foil 372, according to one or more implementations herein. The foil 372 may be further defined by one or more foil securing through-holes 374 and a chord line 376. The chord line 376 of the foil 372 may be understood as an imaginary line segment beginning at either a leading edge 372a or a trailing edge 372b of the foil 372 and terminating at the other of the leading edge 372a or the trailing edge 372b. The chord line 376 may thus be used to describe the geometry of the foil 372, and used to understand the lift fluid dynamics properties of the foil 372. In some implementations the chord line 376 may be external to the extents (e.g., the shape bounded by all surfaces of the foil) of the foil 372. It will be understood that the foil extensions of the disks will in various implementations correspond to the extents and dimensions of the foils of the turbine 350.

Figure 4:
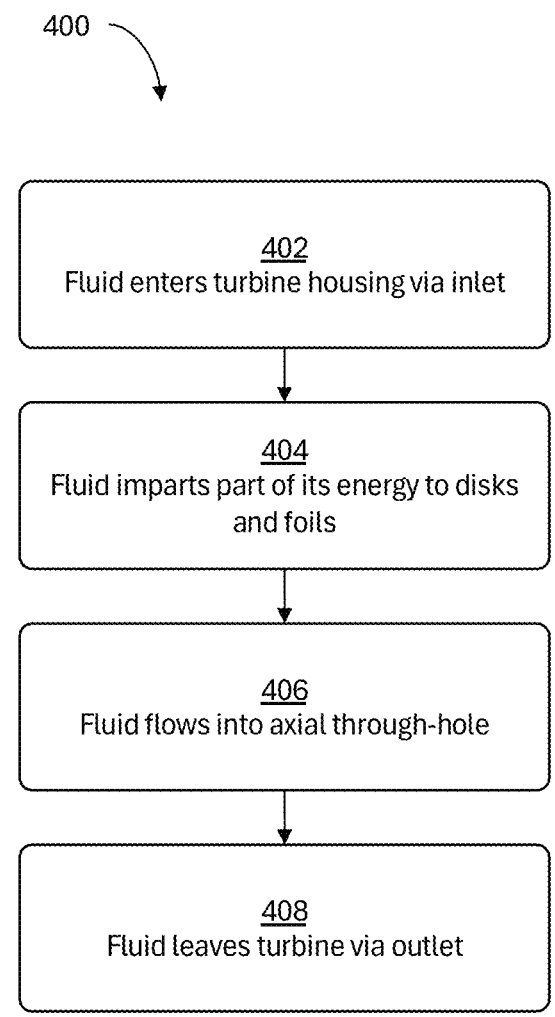
FIG. 4 is a flowchart illustrating an example process for operating a turbine system, according to one or more implementations herein.

FIG. 4 is a flowchart illustrating an example method 400 for operating a turbine system, according to one or more implementations herein. In some implementations, one or more operations may be performed by one or more of the components illustrated in FIG. 1A-3F or 5A-5E. In some implementations, one or more operations may be performed by another device or system, or group of devices or systems separate from or including these. Additionally, or alternatively other devices, components, or systems, may be employed to perform the operations.

An operation 402 may include a fluid entering a turbine housing via an inlet and may be performed alone or in combination with one or more other operations depicted in FIG. 4.

An operation 404 may include the fluid imparting part of its energy to disks and foils of the turbine and may be performed alone or in combination with one or more other operations depicted in FIG. 4.

An operation 406 may include the fluid flowing into an axial through-hole and may be performed alone or in combination with one or more other operations depicted in FIG. 4.

An operation 408 may include the fluid leaving the turbine via an outlet and may be performed alone or in combination with one or more other operations depicted in FIG. 4.

Although FIG. 4 depicts an example method 400 and operations thereof, in some implementations, a method illustrated herein may include additional operations, fewer operations, differently arranged operations, or different operations than the operations depicted in FIG. 4. Moreover, or in the alternative, two or more of the operations depicted in FIG. 4 may be performed at least partially in parallel.

FIGS. 5A-5E illustrate an example implementation of a fluid turbine herein in a solar generator 500, according to one or more implementations herein. FIGS. 5A-5E may depict the solar generator 500 as including a boiler 510, a turbine 520, a hot water tank 530, a condenser 540, and a solar concentrator 550. The solar generator 500 is depicted as being operated based on incidence of solar radiation from the sun 560, although artificial heat sources may also or alternatively be used.

Figure 5A:
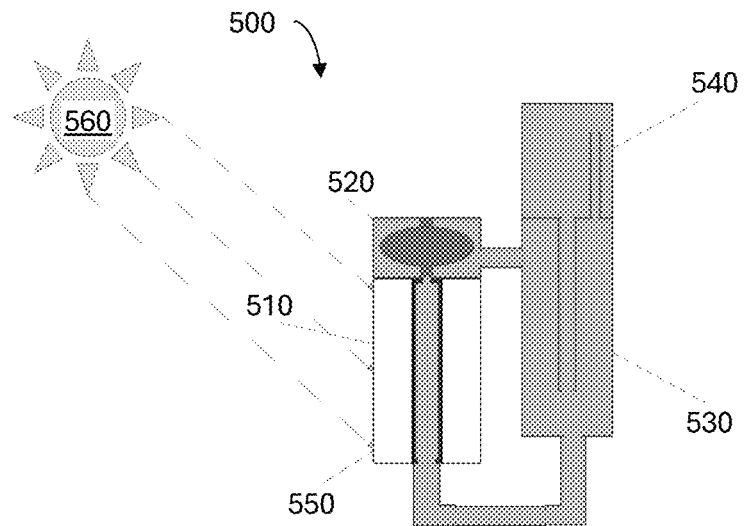
FIG. 5A illustrates an initial state of the solar generator, according to one or more implementations herein.

FIG. 5A illustrates an initial state of the solar generator 500, according to one or more implementations herein. In the initial state, water is present at a resting pressure and temperature, as solar radiation begins to heat the water within the boiler 510. Effectiveness of the boiler 510 may be increased in solar applications using a solar concentrator 550.

Figure 5B:
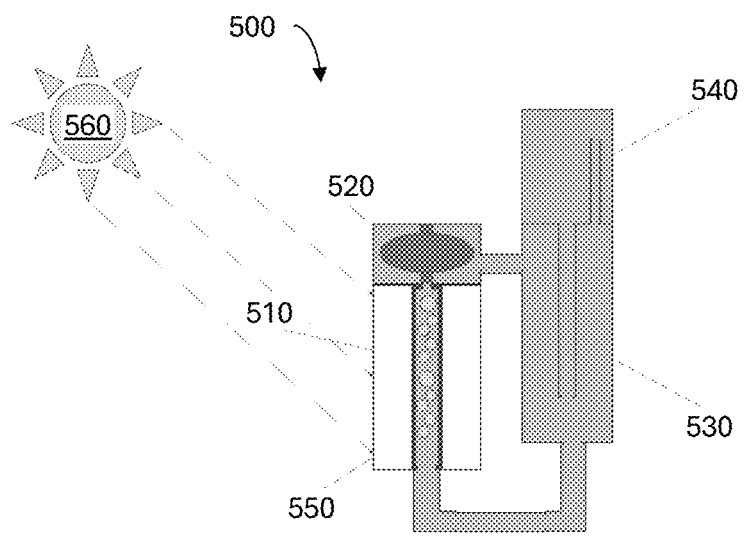
FIG. 5B illustrates a first startup state of the solar generator, according to one or more implementations herein.

FIG. 5B illustrates a first startup state of the solar generator 500, according to one or more implementations herein. In the first startup state, water within the boiler 510 begins to boil, generating steam, which rises toward the turbine 520. The overall pressure within the turbine 520 increases as the steam develops.

Figure 5C:
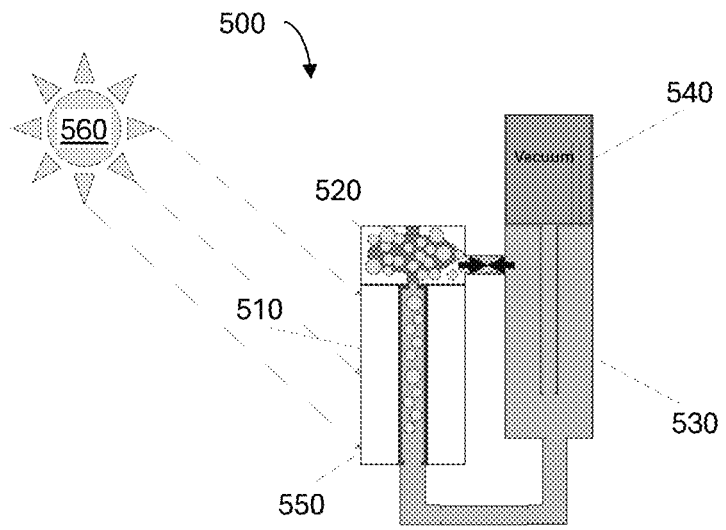
FIG. 5C illustrates a second startup state of the solar generator, according to one or more implementations herein.

FIG. 5C illustrates a second startup state of the solar generator 500, according to one or more implementations herein. In the second startup state, steam is continuously generated within the boiler 510, and a vacuum condition develops within the condenser 540 as water boils within the boiler 510 and steam builds pressure in the turbine 520, where the water exits the condenser 540 via gravity. The pressure within the turbine 520 increases further as steam builds up and passage into the hot water tank 530 is prevented due to remaining presence of water in the hot water tank 530 at the fluid connection to the turbine 520.

Figure 5D:
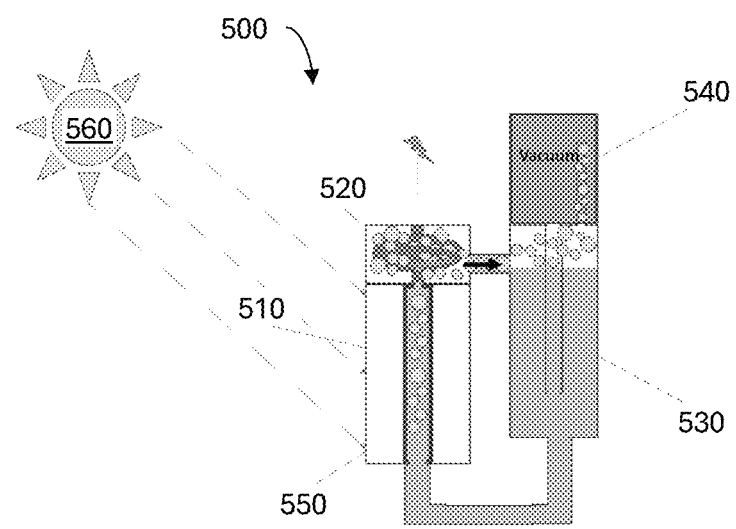
FIG. 5D illustrates a third startup state of the solar generator, according to one or more implementations herein.

FIG. 5D illustrates a third startup state of the solar generator 500, according to one or more implementations herein. In the third startup state, the water level within the hot water tank 530 decreases sufficiently to allow expansion of the steam from the turbine first into the hot water tank 530 and then into the condenser 540. Steam begins to condense within the condenser 540. Water continues to boil within the boiler 510. The turbine 520 begins to rotate once sufficient steam velocity is reached.

Figure 5E:
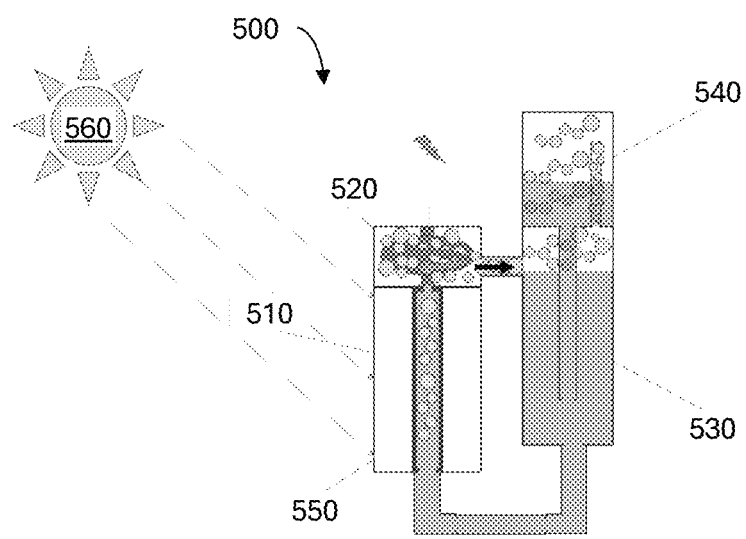
FIG. 5E illustrates a running state of the solar generator, according to one or more implementations herein.

FIG. 5E illustrates a running state of the solar generator 500, according to one or more implementations herein. In the running state, water is continually condensed within the condenser 540 and boiled within the boiler 510, such that steam passes through the turbine 520 and into the condenser 540. The turbine 520 continues to rotate due to impingement of steam passing through at a velocity. The turbine 520 may include an output shaft, which may be in mechanical communication with a generator.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or sample claim limitation should not be interpreted to invoke 35 U.S.C. § 112 (f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. A turbine system, comprising:
   a housing including a fluid inlet, a fluid outlet, and a rotational mount; and
   a turbine disposed on the rotational mount and configured to rotate about an axis of the rotational mount, the turbine comprising:
      a first disk coaxial with a rotational axis defined by a first disk radius, a first disk thickness, a first through-hole coaxial with the rotational axis and having a first through-hole radius, and a plurality of first disk securing through-holes;
      a plurality of first foils arranged in a first radial pattern about the rotational axis, each first foil of the plurality of first foils having a leading edge, a trailing edge, an upper surface, and a lower surface and defined by a first foil thickness equal to the first disk thickness and a first foil securing through-hole, wherein a first foil incircle radius of a first foil incircle defined by the plurality of first foils is equal to the first through-hole radius;
      a last disk coaxial with the rotational axis defined by a last disk radius equal to the first disk radius, a last disk thickness equal to the first disk thickness, a last through-hole coaxial with the rotational axis and having a last through-hole radius smaller than the first through-hole radius, and a plurality of last disk securing through-holes; and
      a plurality of fasteners, each fastener of the plurality of fasteners disposed within one of the first disk securing through-holes, one of the first foil securing through-holes, and one of the last disk securing through-holes;
   wherein a fluid path from the fluid inlet to the fluid outlet is defined by the first disk, the last disk, and the plurality of first foils.

2. The turbine system of claim 1, wherein each first foil of the plurality of first foils defines a chord line external to an extent of the first foil.

3. The turbine system of claim 1, wherein the rotational mount includes an eccentric bearing, and wherein the turbine is configured to rotate about an axis-of-rotation of the eccentric bearing.

4. A turbine system, comprising:
   a first disk coaxial with a rotational axis defined by a first disk radius, a first disk thickness, and a first through-hole coaxial with the rotational axis and having a first through-hole radius;
   a plurality of first foils arranged in a first radial pattern about the rotational axis, each first foil of the plurality of first foils having a leading edge, a trailing edge, an upper surface, and a lower surface and defined by a first foil thickness; and
   a last disk coaxial with the rotational axis defined by a last disk radius, a last disk thickness, and a last through-hole coaxial with the rotational axis and having a last through-hole radius;
   wherein the last through-hole radius is smaller than the first through-hole radius and a first foil incircle radius of a first foil incircle defined by the plurality of first foils is equal to the last through-hole radius.

5. The turbine system of claim 4, wherein the last disk radius equals the first disk radius.

6. The turbine system of claim 4, wherein the first foil thickness equals the first disk thickness.

7. The turbine system of claim 6, wherein the last disk thickness equals the first disk thickness.

8. The turbine system of claim 4, wherein the last disk thickness equals the first disk thickness.

9. The turbine system of claim 4, further comprising:
   a plurality of second foils arranged in a last radial pattern about the rotational axis and defined by a second foil thickness; and
   an intermediate disk coaxial with the rotational axis defined by an intermediate disk radius, an intermediate disk thickness, and an intermediate through-hole coaxial with the rotational axis and having an intermediate through-hole radius.

10. The turbine system of claim 9, wherein the second foil thickness equals the first foil thickness.

11. The turbine system of claim 9, wherein the intermediate through-hole radius equals the first through-hole radius.

12. The turbine system of claim 9, wherein the intermediate through-hole radius is smaller than the first through-hole radius and larger than the last through-hole radius.

13. The turbine system of claim 12, wherein the first foil incircle radius of the first foil incircle defined by the plurality of first foils is equal to the last through-hole radius and a second foil incircle radius of a second foil incircle defined by the plurality of second foils is equal to the last through-hole radius.

14. The turbine system of claim 4, wherein the first disk is further defined by a plurality of first disk securing through-holes, each first foil of the plurality of first foils is further defined by a first foil securing through-hole, and the last disk is further defined by a plurality of last disk securing through-holes and the turbine system further comprises a plurality of fasteners, wherein each fastener of the plurality of fasteners is disposed within one of the first disk securing through-holes, one of the first foil securing through-holes, and one of the last disk securing through-holes.

15. The turbine system of claim 9, wherein the intermediate through-hole radius equals the last through-hole radius.

* * * * *